(12) United States Patent
Sugiyama

(10) Patent No.: US 6,784,882 B1
(45) Date of Patent: Aug. 31, 2004

(54) METHODS AND APPARATUS FOR RENDERING AN IMAGE INCLUDING PORTIONS SEEN THROUGH ONE OR MORE OBJECTS OF THE IMAGE

(75) Inventor: Hajime Sugiyama, Tokyo (JP)

(73) Assignee: Sony Computer Entertainment Inc. (JP)

(*) Notice: Subject to any disclaimer, the term of this patent is extended or adjusted under 35 U.S.C. 154(b) by 344 days.

(21) Appl. No.: 09/656,377

(22) Filed: Sep. 6, 2000

(30) Foreign Application Priority Data

Sep. 10, 1999 (JP) .......................... 11-257565

(51) Int. Cl.⁷ .............................. G06F 15/00
(52) U.S. Cl. .............. 345/419; 345/420; 345/421; 345/426; 345/581; 345/606
(58) Field of Search ............... 345/581, 582, 345/606–610, 419–426

(56) References Cited

U.S. PATENT DOCUMENTS

| | | | |
|---|---|---|---|
| 5,359,704 A | * 10/1994 | Rossignac et al. | 345/422 |
| 5,369,734 A | * 11/1994 | Suzuki et al. | 345/421 |
| 5,561,746 A | * 10/1996 | Murata et al. | 345/419 |
| 5,579,454 A | * 11/1996 | Billyard et al. | 345/421 |
| 5,615,322 A | * 3/1997 | Murata et al. | 345/427 |
| 5,644,689 A | * 7/1997 | Ban et al. | 345/424 |
| 5,720,020 A | * 2/1998 | Tannenbaum et al. | 345/629 |
| 5,805,135 A | * 9/1998 | Suzuoki et al. | 345/420 |
| 5,870,099 A | * 2/1999 | Horii et al. | 345/427 |
| 5,877,769 A | * 3/1999 | Shinohara | 345/419 |
| 5,947,823 A | * 9/1999 | Nimura | 463/32 |
| 5,956,028 A | * 9/1999 | Matsui et al. | 345/757 |
| 5,977,979 A | * 11/1999 | Clough et al. | 345/422 |
| 6,005,967 A | * 12/1999 | Nakagawa et al. | 382/154 |
| 6,034,691 A | * 3/2000 | Aono et al. | 345/582 |
| 6,049,337 A | * 4/2000 | Van Overveld | 345/582 |
| 6,091,422 A | * 7/2000 | Ouaknine et al. | 345/419 |
| 6,201,546 B1 | * 3/2001 | Bodor et al. | 345/620 |
| 6,226,005 B1 | * 5/2001 | Laferriere | 345/426 |
| 6,392,644 B1 | * 5/2002 | Miyata et al. | 345/419 |
| 6,400,364 B1 | * 6/2002 | Akisada et al. | 345/427 |
| 6,417,850 B1 | * 7/2002 | Kang | 345/422 |

FOREIGN PATENT DOCUMENTS

| | | |
|---|---|---|
| EP | 0 379 225 A2 | 7/1990 |
| EP | 0 447 222 A2 | 9/1991 |
| EP | 0 666 548 A1 | 8/1995 |
| JP | 11-003432 A1 | 1/1999 |
| WO | WO 97/34213 | 9/1997 |

OTHER PUBLICATIONS

Foley et al, "Computer Graphics: Principles and Practice", Second Edition, Jul. 1997, p 673.*

* cited by examiner

Primary Examiner—Michael Razavi
Assistant Examiner—Daniel Chuang
(74) Attorney, Agent, or Firm—Lerner, David, Littenberg, Krumholz & Mentlik, LLP (57) ABSTRACT

Surfaces of an object are rendered in the order from a surface remotest from a viewpoint. When a rear surface, e.g., a rear surface, is to be rendered, a range, i.e., a range of a texture to be used, projected by way of perspective projection with vectors which are directed from the viewpoint toward a background image and take into account refractions at vertexes of the surface is determined, and the texture in the determined range is mapped onto the surface. When a front surface, e.g., a front surface, is to be rendered, a range, i.e., a range of a texture to be used, projected by way of perspective projection with vectors which are directed from the viewpoint toward a background image and take into account refractions at vertexes of the surface is determined, and the texture in the determined range is mapped onto the surface.

3 Claims, 10 Drawing Sheets

METHODS AND APPARATUS FOR RENDERING AN IMAGE INCLUDING PORTIONS SEEN THROUGH ONE OR MORE OBJECTS OF THE IMAGE

BACKGROUND OF THE INVENTION

1. Field of the Invention

The present invention relates to a method of and an apparatus for rendering an image to express light rays passing through an object and refracted thereby, i.e., a phenomenon known as refraction, at a high speed with a three-dimensional image, a recording medium which stores a program and data for performing such image processing, and a program for performing such image processing.

2. Description of the Related Art

Recently, various computer graphics (CG) processing techniques including hidden line processing, hidden surface removal, smooth shading, texture mapping, etc. have been in rapid progress in combination with quickly growing hardware technologies.

According to a general CG processing scheme, a plurality of three-dimensional shapes (objects) are generated by three-dimensional modeling of CAD, and a rendering process is performed by applying colors and shades to the objects, adding optical properties including mirror reflection, diffuse reflection, refraction, transparency, etc. to the objects, adding surface patterns to the objects, and plotting images depending on surroundings such as window and scenery reflections and ambient light.

If light rays passing through an object and refracted thereby, for example, are to be expressed as a three-dimensional image, then it is necessary to reproduce such an optical phenomenon. The vector of a light ray that is radiated from a viewpoint is refracted when the light ray enters the object and also when the light ray leaves the object.

In order to express the above phenomenon of refraction with a three-dimensional image, it is customary to employ ray tracing rather than polygons.

According to the ray tracing technique, light rays are traced in a space where an object is placed, and the object is rendered with points of intersection between the light rays and the object. Stated otherwise, the intensity of light rays that arrive at a viewpoint is tracked back from the viewpoint while reproducing reflections and refractions at the surfaces of the object according to the realistic behavior of the light rays.

Specifically, a point of intersection between a light ray from a fixed viewpoint and an object as a displayed pixel is sought, and if there is such a point of intersection, then the light ray as it is reflected or refracted by the object is traced. Information as to the point of intersection is stored as information as to the displayed pixel. The information determined with respect to each pixel represents inherent color characteristics including hue, saturation, and brightness, textures including reflections, refractions, gloss, and luster, or shadows and highlights.

However, the ray tracing technique is disadvantageous in that since the above information is associated with each pixel, the overall amount of information that is required is large, and the time required to perform calculations for ray tracing is long.

SUMMARY OF THE INVENTION

It is therefore an object of the present invention to provide a method of and an apparatus for rendering an image, a recording medium, and a program to express light rays passing through an object and refracted thereby at a high speed with a three-dimensional image, for thereby expressing a moving transparent object simply and at a high speed.

According to the present invention, there is provided a method of rendering an image, comprising the steps of rendering surfaces of an object which causes refraction in the order from a surface remotest from a viewpoint, and employing a background image of each of the surfaces as a texture when the surfaces are rendered.

According to the present invention, there is also provided an apparatus for rendering an image, comprising rendering means for rendering surfaces of an object which causes refraction in the order from a surface remotest from a viewpoint, and employing a background image of each of the surfaces as a texture when the surfaces are rendered.

According to the present invention, there is further provided a recording medium storing a program and data, the program comprising the steps of rendering surfaces of an object which causes refraction in the order from a surface remotest from a viewpoint, and employing a background image of each of the surfaces as a texture when the surfaces are rendered.

According to the present invention, there is still further provided a program which can be read and executed by a computer, comprising the steps of rendering surfaces of an object which causes refraction in the order from a surface remotest from a viewpoint, and employing a background image of each of the surfaces as a texture when the surfaces are rendered.

When each surface is to be rendered, since only the background image in each surface is used as a texture image, images can be processed at a high speed. Consequently, light rays passing through an object and refracted thereby can be expressed at a high speed with a three-dimensional image, for thereby expressing a moving transparent object simply and at a high speed.

Preferably, a portion of the background image in a range projected by way of perspective projection with vectors which are directed from the viewpoint toward the background image and take into account refractions at vertexes of the surface is used as the texture when the surface is rendered.

The vectors may be determined based on at least the directions of normals to the surface in a viewpoint coordinate system and the directions of line segments directed from the viewpoint toward the vertexes.

Specifically, the positions of the vertexes as projected onto a uz plane which is made up of a u-axis of the background image and a z-axis of the viewpoint coordinate system are determined, and the coordinates of the vertexes on the u-axis of the background image are determined based on at least the directions of line segments directed from the viewpoint toward the projected positions and the directions of the normals in the uz plane. The positions of the vertexes as projected onto a vz plane which is made up of a v-axis of the background image and the z-axis of the viewpoint coordinate system are determined, and the coordinates of the vertexes on the v-axis of the background image are determined based on at least the directions of line segments directed from the viewpoint toward the projected positions and the directions of the normals in the vz plane.

The background image to be mapped onto the surface can easily be determined, and hence a phenomenon of refraction can be displayed as a three-dimensional image at a high speed.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

An embodiment in which a method of and an apparatus for rendering an image are applied to an entertainment apparatus for performing three-dimensional CG processing, and a recording medium and a program are applied to a recording medium storing a program and data executed by the entertainment apparatus and such a program, will be described below with reference to FIGS. 1 through 10.

Figure 1:
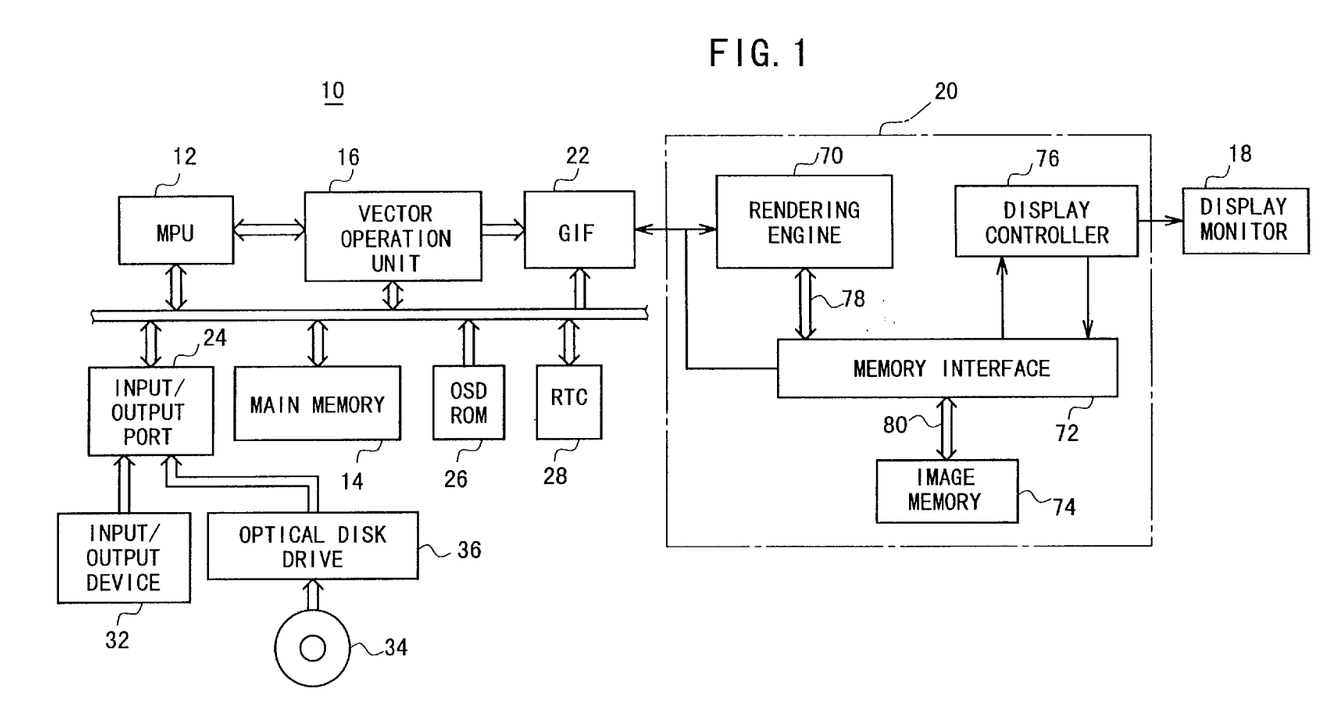
FIG. 1 is a block diagram of a general arrangement of an entertainment apparatus according to the present invention.

As shown in FIG. 1, an entertainment apparatus 10 comprises an MPU 12 for controlling the entertainment apparatus 10, a main memory 14 for storing various programs to be run and various data, a vector operation unit 16 for performing floating-point vector operations required for geometry processing, an image processor 20 for generating image data under the control of the MPU 12 and outputting the generated image data to a display monitor 18, e.g., a CRT, a graphic interface (GIF) 22 for arbitrating transfer paths between the MPU 12, the vector operation unit 16, and the image processor 20, an input/output port 24 for sending data to and receiving data from external devices, a ROM (OSDROM) 26 with an OSD function, which may comprise a flash memory or the like, for controlling the kernel, etc., and a real-time clock 28 having a calendar and clock function.

The main memory 14, the vector operation unit 16, the GIF 22, the OSDROM 26, the real-time clock 28, and the input/output port 24 are connected to the MPU 12 via a bus 30.

To the input/output port 24, there are connected an input/output device 32 for inputting data (key entry data, coordinate data, etc.) to the entertainment apparatus 10, and an optical disk drive 36 for playing back an optical disk 34 such as a CD-ROM or the like in which various programs and data (object-related data, texture data, etc.) are stored.

As shown in FIG. 1, the image processor 20 comprises a rendering engine 70, a memory interface 72, an image memory 74, and a display controller 76 such as a programmable CRT controller or the like.

The rendering engine 70 serves to render image data in the image memory 74 via the memory interface 72 based on a rendering command supplied from the MPU 12.

A first bus 78 is connected between the memory interface 72 and the rendering engine 70, and a second bus 80 is connected between the memory interface 72 and the image memory 74. Each of the first and second buses 78, 80 has a 128-bit width, for example, for allowing the rendering engine 70 to render image data in the image memory 74 at a high speed.

The rendering engine 70 is capable of rendering image data of 320×240 pixels or image data of 640×480 pixels according to the NTSC or PAL system on a real-time fashion, i.e., in 1/60 seconds to 1/30 seconds, more than ten times to several ten times.

The image memory 74 is of a unified memory structure that is able to designate a texture rendering area and a display rendering area as the same area.

The image controller 76 writes texture data read from the optical disk 34 via the optical disk drive 36 or texture data generated in the main memory 14 via the memory interface 72 into the texture rendering area of the image memory 74, and reads image data rendered in the display rendering area of the image memory 74 via the memory interface 72 and outputs the read image data to the display monitor 18 to display an image on its display screen.

A characteristic function of the entertainment apparatus will be described below with reference to FIGS. 2 through 10.

According to the characteristic function, for rendering an object that causes refraction, the surfaces of the object are rendered successively from the one remotest from a viewpoint, and the background image of a surface is used as a texture when each surface is rendered.

A portion of the background image in a range projected by way of perspective projection with vectors which are directed from the viewpoint toward the background image and take into account refractions at vertexes of the surface is employed as the texture, for example, when the surface is rendered.

A vector taking into account the refraction at each of the vertexes of a surface can be determined based on at least the direction of a normal to the surface in a viewpoint coordinate system and the direction of a line segment directed from the viewpoint toward each vertex.

Figure 2:
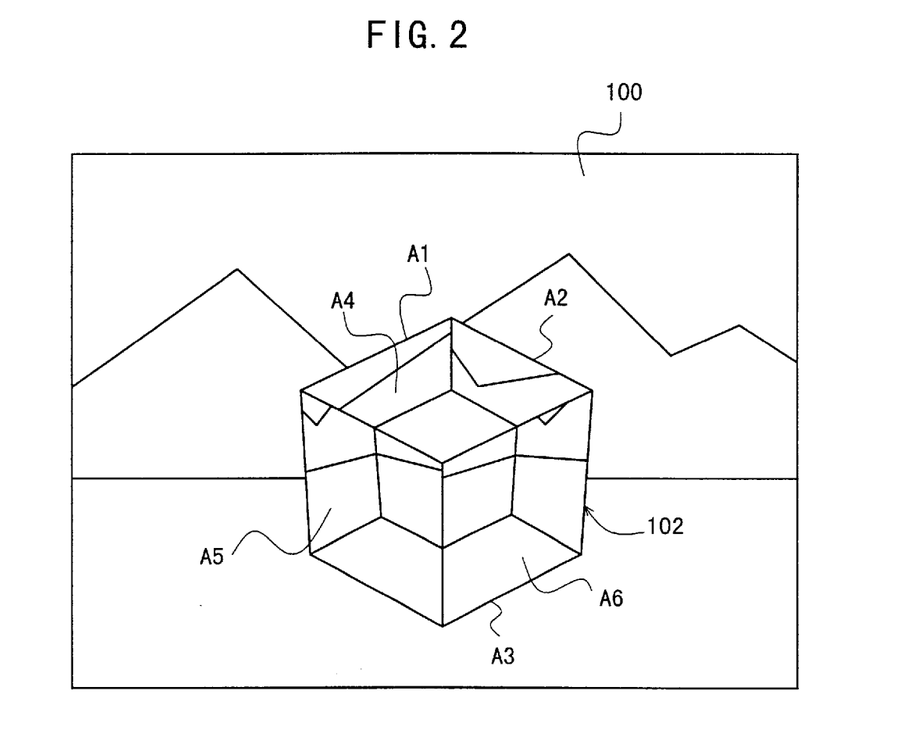
FIG. 2 is a diagram of a displayed image of a mountain scene rendered as a background image and a cube of a material such as glass placed in front of the mountain scene.

A specific process for performing the above characteristic function will be described below with reference to FIGS. 2 through 7. FIG. 2 shows a displayed image of a mountain scene rendered as a background image 100 and a cube 102 of a material such as glass placed in front of the mountain scene. Light rays passing through the cube 102 in the displayed image are refracted according to the above characteristic function.

Figure 3:
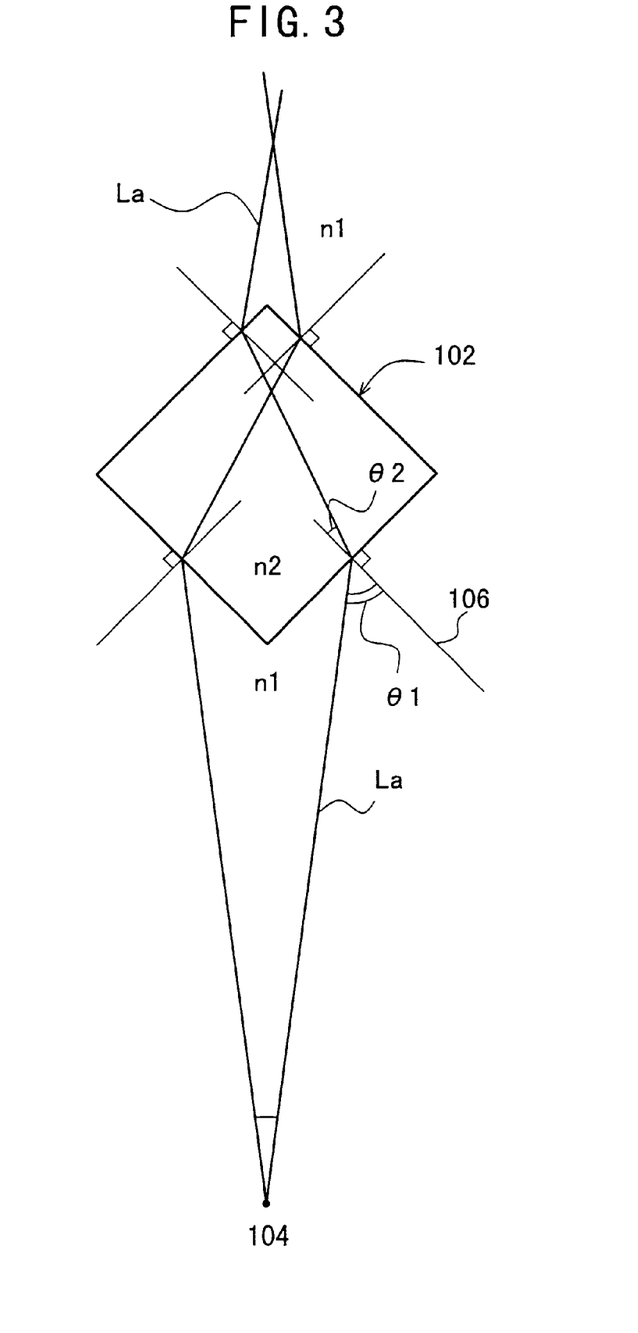
FIG. 3 is a diagram illustrating the manner in which the vector of light rays radiated from a viewpoint is refracted by the cube.

As shown in FIG. 3, the vector of a light ray La radiated from a viewpoint 104 is refracted when the light ray La enters the cube 102 and when the light ray La leaves the cube 102. If it is assumed that the space outside of the cube 102 has a refractive index n1, the cube 102 has a refractive index n2, the light ray La is applied to a surface, closer to the viewpoint 104, of the cube 102 at an incident angle θ1, i.e., an angle between the light ray La and a normal 106 to the surface, and the light ray La leaves the surface of the cube 102 at an exit angle θ2, i.e., an angle between the light ray La and a normal 106 to the surface, then the refraction of the light lay La at the surface is represented by the following equation known as the Snell's law:

$$n1 \sin\theta1 = n2 \sin\theta2$$

The relationship represented by the above equation also holds true for the refraction of the light lay La at another surface, remoter from the viewpoint 104, of the cube 102.

A method of rendering an image according to the present invention determines the positions of the surfaces of the cube 102 in the background image based on the above relationship.

Figure 4A:
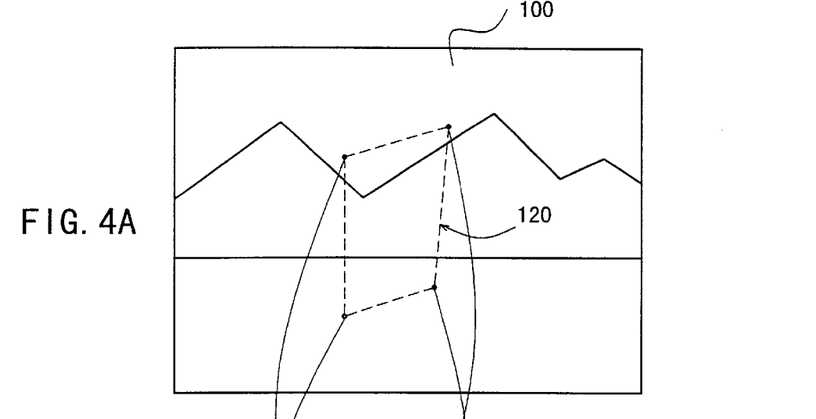
FIG. 4A is a diagram illustrating the range of a texture image for use as a rear surface of a cube.
Figure 4B:
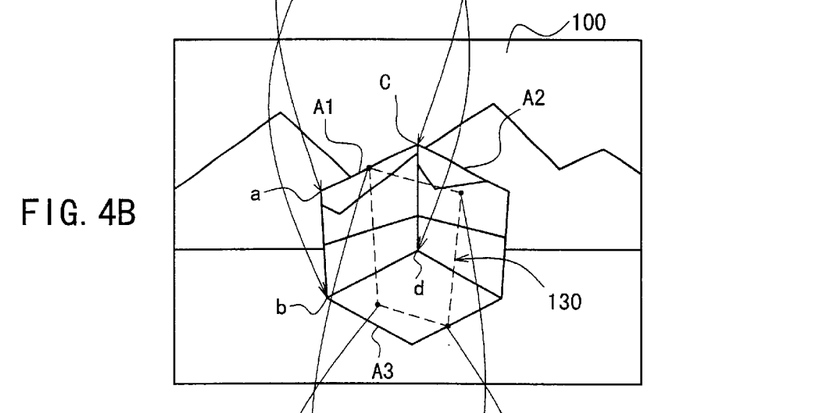
FIG. 4B is a diagram illustrating the texture image shown in FIG. 4A as applied to the cube and the range of a texture image for use as a front surface of the cube.

Specifically, as shown in FIGS. 4A and 4B, of the six surfaces of the cube 102, a surface A1 remotest from the viewpoint is selected, and the positions in the background image 100 of the vertexes a, b, c, d of the surface A1, more accurately, the position of the surface A1 in the background image 100, are determined based on at least the direction of a normal to the surface A1 in a viewpoint coordinate system and the directions of line segments directed from the viewpoint toward the vertexes a, b, c, d.

The position of the surface A1 in the background image 100 is a position in the background image 100 that is rendered in the image memory 74. Determining the position of the surface A1 in the background image 100 is equivalent to determining the position of the surface A1 in a uv coordinate system having a u-axis as the horizontal axis of the background image 100 and a v-axis as the vertical axis of the background image 100.

The positions of the vertexes a, b, c, d as projected onto a uz plane which is made up of the u-axis of the background image 100 and a z-axis of the viewpoint coordinate system are determined, and the coordinates of the vertexes a, b, c, d on the u-axis of the background image 100 are determined based on at least the directions of line segments directed from the viewpoint 104 toward the projected positions and the direction of the normal to the surface A1 on the uz plane.

Figure 5:
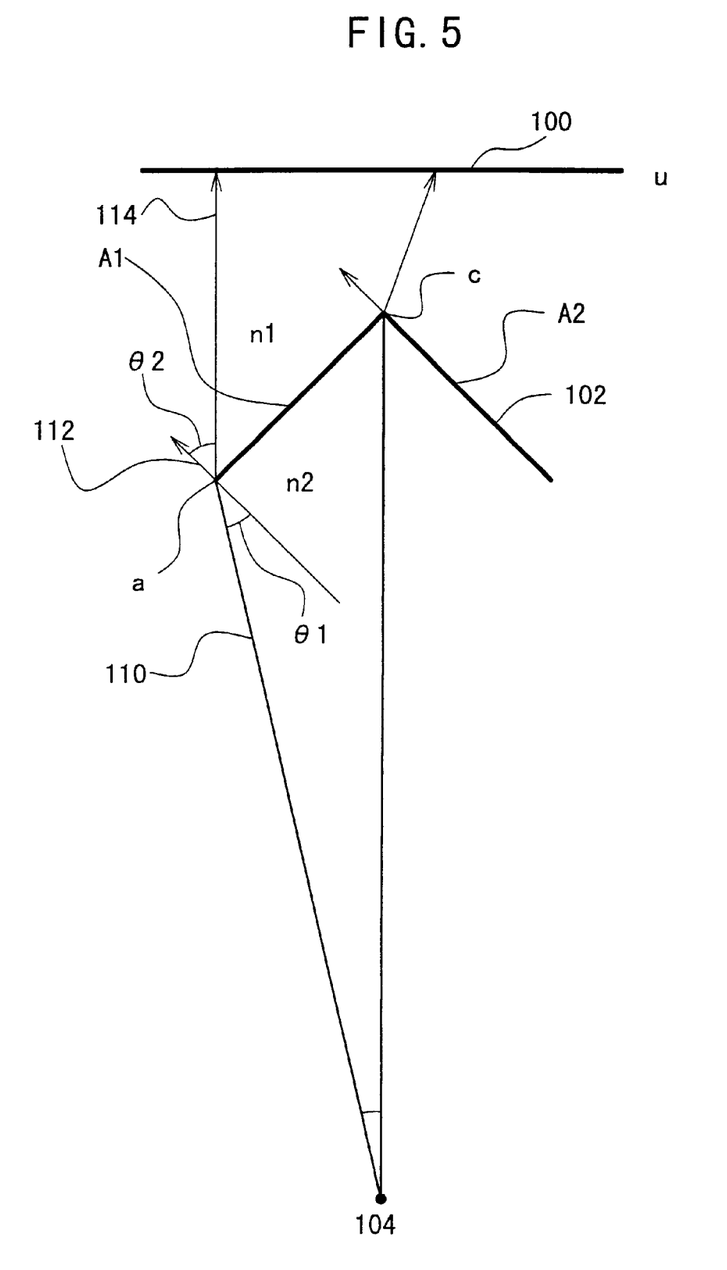
FIG. 5 is a diagram illustrating the manner in which vertexes of the rear surface of the cube are projected onto the background image in view of refractions by way of perspective projection.

For example, as shown in FIG. 5, a line segment 110 from the viewpoint 104 toward a vertex a of the rear surface A1 is analyzed. The direction, i.e., the exit angle θ2, of the line segment 110 from the vertex a toward the background image 100 is determined based on the angle (incident angle) θ1 between the line segment 110 and the normal 112, the refractive index n2 of the cube 102, and the refractive index of the space. The position of a u coordinate of the vertex a in the background image 100 is determined by projecting the vertex a onto the background 100 by way of perspective projection according to the vector of a line segment 114 that is determined by the exit angle θ2. The positions of u coordinates of the other vertexes b, c, d of the surface A1 in the background image 100 are similarly determined.

Then, the positions of the vertexes a, b, c, d as projected onto a vz plane which is made up of the v-axis of the background image 100 and the z-axis of the viewpoint coordinate system are determined, and the coordinates of the vertexes a, b, c, d on the v-axis of the background image 100 are determined based on at least the directions of line segments directed from the viewpoint 104 toward the projected positions and the direction of the normal to the surface A1 on the vz plane.

For example, although not shown, line segment from the viewpoint 104 toward the vertex a is analyzed. The direction, i.e., the exit angle θ2, of the line segment from the vertex a toward the background image 100 is determined based on the angle (incident angle) θ1 between the line segment and the normal, the refractive index n2 of the cube 102, and the refractive index n1 of the space. The position of a v coordinate of the vertex a in the background image 100 is determined by projecting the vertex a onto the background 100 by way of perspective projection according to the vector of a line segment that is determined by the exit angle θ2. The positions of v coordinates of the other vertexes b, c, d in the background image 100 are similarly determined.

In this manner, the u, v coordinates (u, v) of the vertex a of the rear surface A1 in the background image 100 are determined. Similarly, the coordinates of the other vertexes in the background image 100 are determined. Now, as shown in FIGS. 4A and 4B, a range projected by vectors directed from the viewpoint 104 via the surface A1 toward the background image 100 and taking into account the refractions at the vertexes a, b, c, d of the surface A1, i.e., a range 120 of texture to be used, is determined. The texture of the range 120 is then mapped onto the surface A1, which is rendered in the image memory 74.

After the surface A1 has been rendered in the image memory 74, another rear surface A2 is selected, and then processed in the same manner as described above with respect to the surface A1. The surfaces A1 through A6 that make up the cube 102 are successively selected and processed in the order of A1→A2 A3→A4 A5→A6.

After the three rear surfaces A1, A2, A3 have been rendered in the image memory 74, three front surfaces A4, A5, A6 are selected, and then processed in the same manner as described above.

Figure 6:
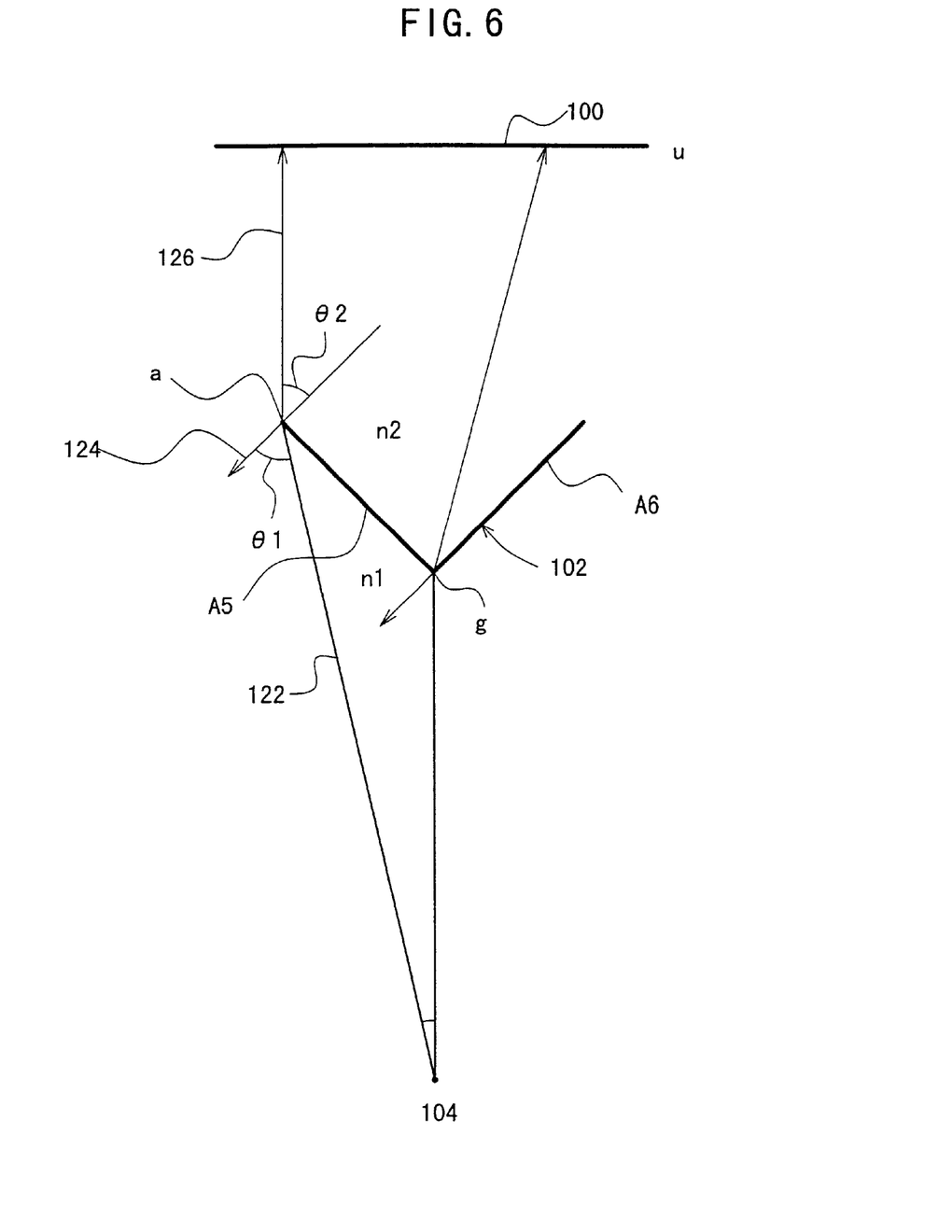
FIG. 6 is a diagram illustrating the manner in which vertexes of the front surface of the cube are projected onto the background image in view of refractions by way of perspective projection.

For example, as shown in FIG. 6, a line segment 122 from the viewpoint 104 toward a vertex a of the front surface A5 is analyzed. The direction, i.e., the exit angle θ2, of the line segment 122 from the vertex a toward the background image 100 is determined based on the angle (incident angle) θ1 between the line segment 122 and a normal 124 to the surface A5, the refractive index n2 of the cube 102, and the refractive index n1 of the space. The position of a u coordinate of the vertex a in the background image 100 is determined by projecting the vertex a onto the background 100 by way of perspective projection according to the vector of a line segment 126 that is determined by the exit angle θ2. The positions of u coordinates of the other vertexes b, g, h of the surface A5 in the background image 100 are similarly determined.

Then, the position of a v coordinate of the vertex a in The background image 100 is determined in the same manner as described above.

Figure 4C:
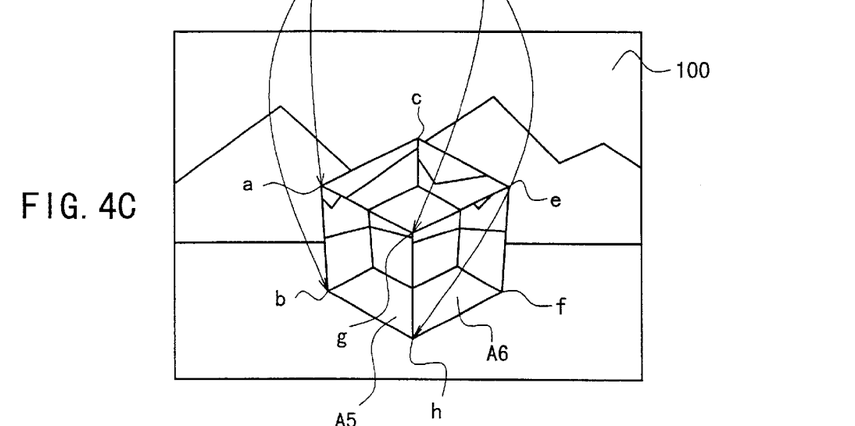
FIG. 4C is a diagram illustrating the texture image shown in FIG. 4B as applied to the cube.

In this manner, the u, v coordinates (u, v) of the vertex a of the front surface A5 in the background image 100 are determined. Similarly, the u, v coordinates for the other vertexes b, g, h in the background image 100 are determined. Now, as shown in FIGS. 4B and 4C, a range projected by vectors directed from the viewpoint 104 via the surface A5 toward the background image 100 and taking into account the refractions at the vertexes a, b, g, h of the surface A5, i.e., a range 130 of texture to be used, is determined. The texture of the range 130 is then mapped onto the surface A5, which is rendered in the image memory 74. At this time, images of the three rear surfaces A1, A2, A3 are rendered in the background image 100 in the front surface A5, and the texture of the front surface A5 includes the images of the three rear surfaces A1, A2, A3.

After the surface A5 has been rendered in the image memory 74, another front surface A6 is selected, and then processed in the same manner as described above with respect to the surface A5.

Figure 7:
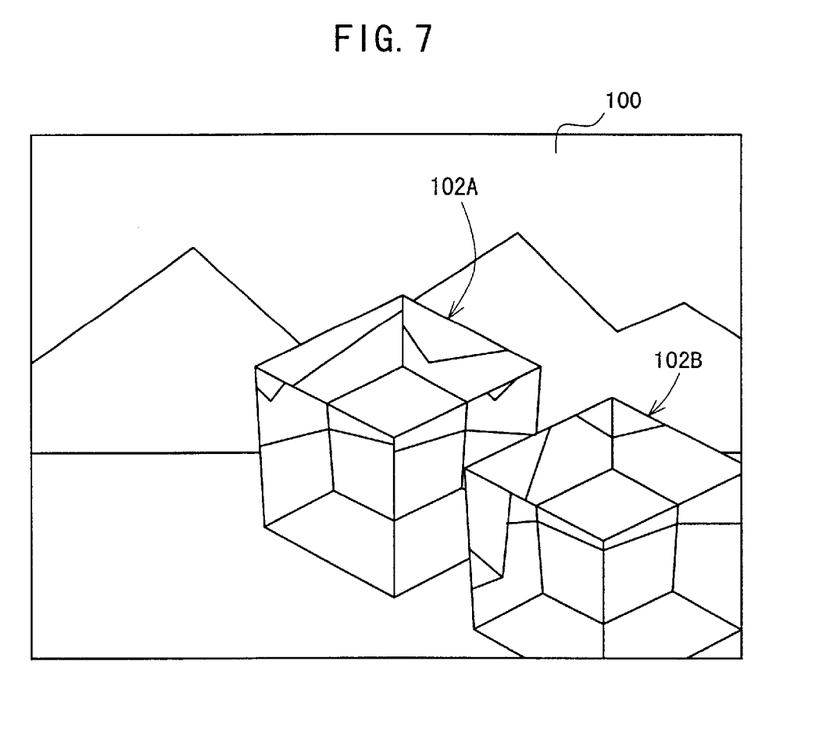
FIG. 7 is a diagram of a displayed image of a mountain scene rendered as a background image and two cubes of a material such as glass placed in front of the mountain scene.

In the above example, one cube 102 is placed in the mountain scene. However, as shown in FIG. 7, the method according to the present invention is also applicable to a plurality of (two in FIG. 7) cubes 102A, 102B placed in a mountain scene. The cubes 102A, 102B are processed successively in the order from the cube 102A remoter from the viewpoint 104.

An example of software, i.e., a rendering means 200 (see FIG. 8), to perform the above function will be described below with reference to FIGS. 8 through 10.

The rendering means 200 is supplied to the entertainment apparatus 10 from a randomly accessible recording medium such as a CD-ROM or a memory card or via a network. It is assumed here that the rendering means 200 is read into the entertainment apparatus 10 from the optical disk 34 such as a CD-ROM.

The rendering means 200 is downloaded in advance from the optical disk 34 played back by the entertainment apparatus into the main memory 14 of the entertainment apparatus according to a predetermined process, and executed by the MPU 12.

Figure 8:
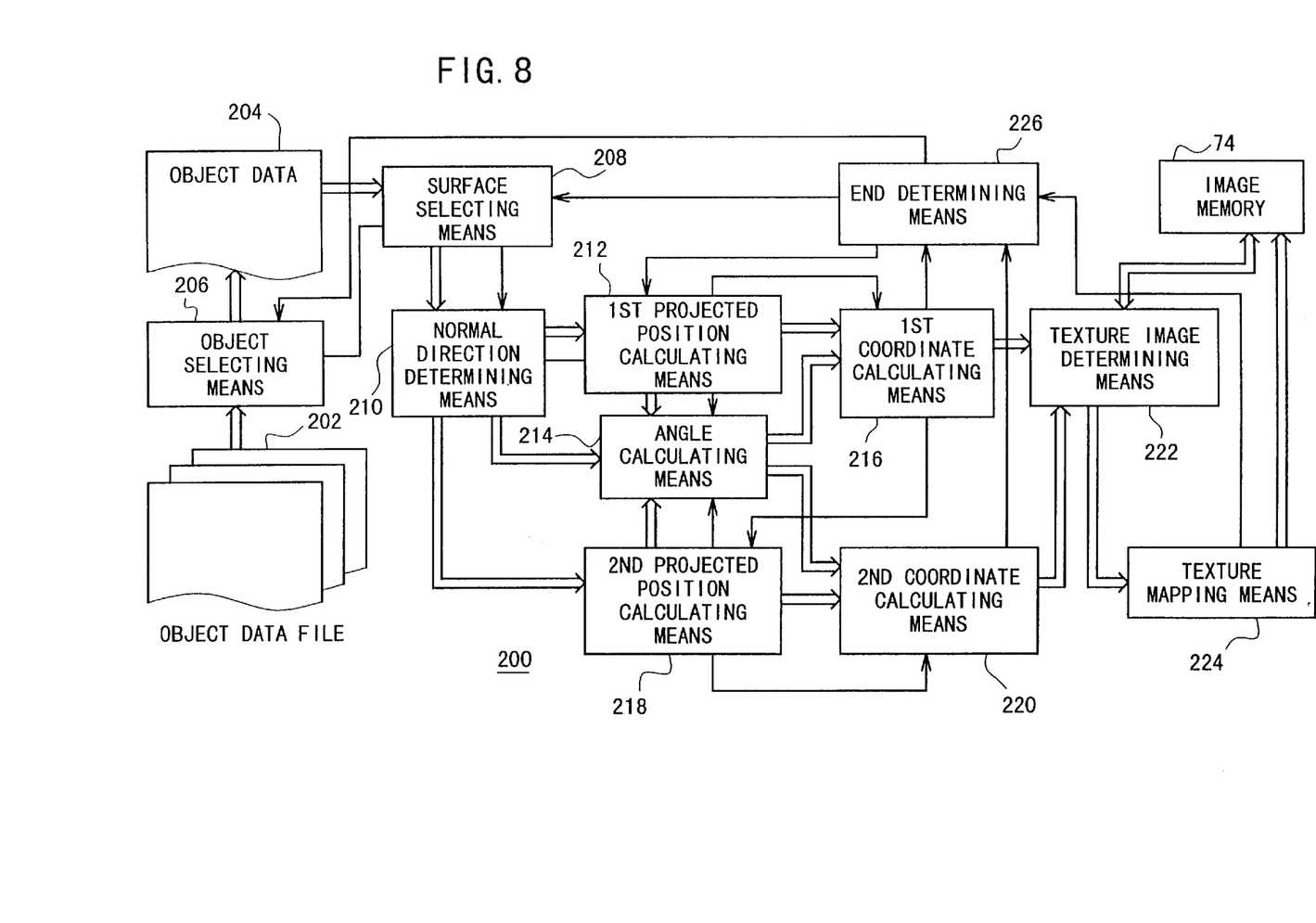
FIG. 8 is a functional block diagram of a rendering means according to the present invention.

As shown in FIG. 8, the rendering means 200 comprises an object selecting means 206 for selecting object data 204 of an object in the order from the one remotest from the viewpoint, among a number of objects registered in an object data file 202, a surface selecting means 208 for selecting a surface in the order from the one remotest from the viewpoint, among a plurality of surfaces of the objects indicated by the selected object data 204, a normal direction determining means 210 for determining the directions of normals in the uz and vz coordinate systems in the selected surface, a first projected position calculating means 212 for determining the position of a vertex of the selected surface as projected onto the uz plane, an angle calculating means 214 for determining an incident angle $\theta1$ and an exit angle $\theta2$, and a first coordinate calculating means 216 for determining u coordinates in the background image 100 based on the projected position of the vertex on the uz plane and the exit angles $\theta2$ at the vertex.

The rendering means 200 also has a second projected position calculating means 218 for determining the position of a vertex of the selected surface as projected onto the vz plane, a second coordinate calculating means 220 for determining v coordinates in the background image 100 based on the projected position of the vertex on the vz plane and the exit angles $\theta2$ at the vertex, a texture image determining means 222 for determining a texture image to be used from the background image 100 based on the uv coordinates of the vertexes, a texture mapping means 224 for mapping the determined texture image onto the selected surface, and an end determining means 226 for determining whether the processing sequence of the rendering means 200 is completed or not.

A processing sequence of the rendering means 200 will be described below with reference to FIGS. 9 and 10.

Figure 9:
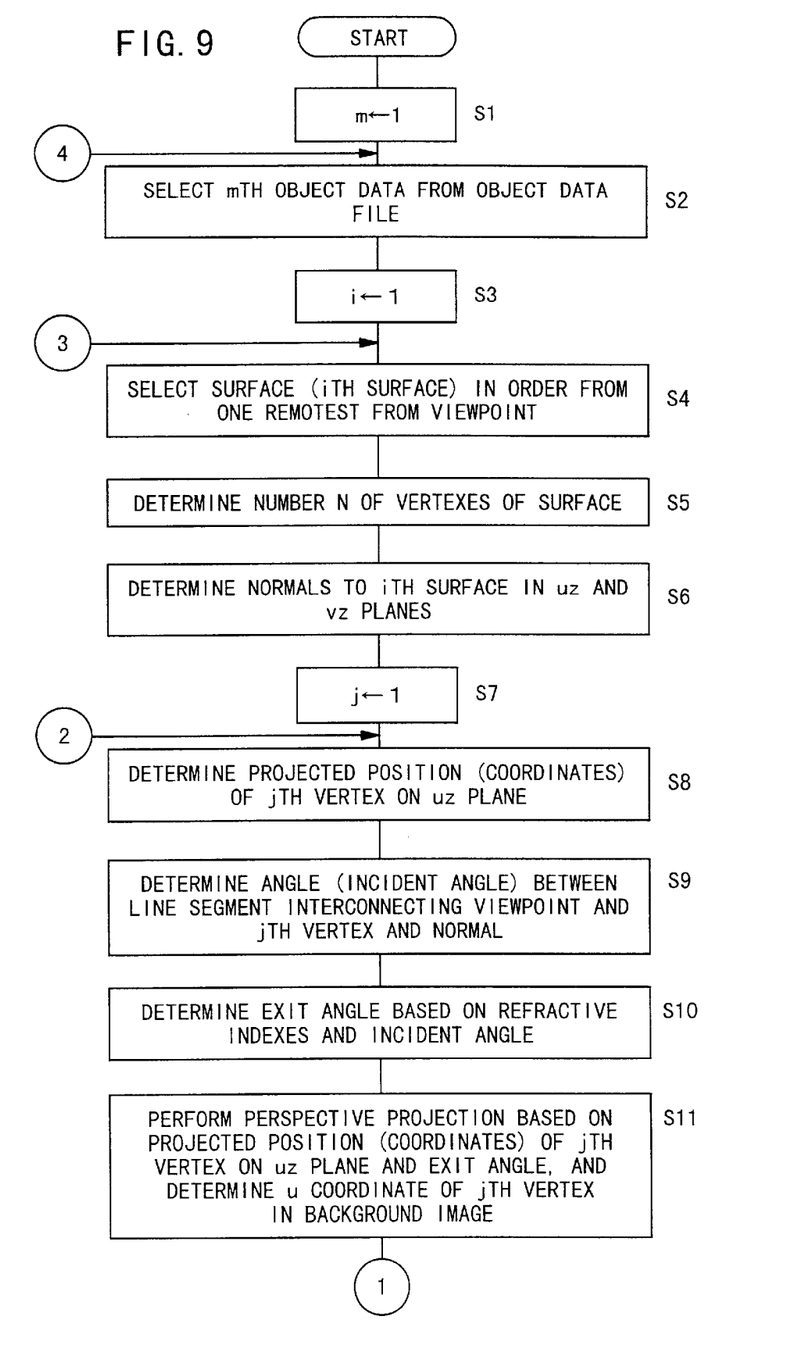
FIGS. 9 and 10 are a flowchart of a processing sequence of the rendering means shown in FIG. 8.

In step S1 shown in FIG. 9, the rendering means 200 stores an initial value "1" into an index register m used to retrieve objects, thereby initializing the index register m.

In step S2, the object selecting means 206 selects object data 204 of an object (mth object) in the order from the one remotest from the viewpoint, among a number of objects registered in the object data file 202.

In step S3, the rendering means 200 stores an initial value "1" into an index register i used to retrieve surfaces of objects, thereby initializing the index register i.

In step S4, the surface selecting means 208 selects a surface (ith surface) in the order from the one remotest from the viewpoint, among a plurality of surfaces of the objects indicated by the selected object data 204.

In step S5, the rendering means 200 determines the number N of vertexes of the ith surface. Thereafter, in step S6, the normal direction determining means 210 determines the directions of normals to the ith surface in the uz and vz coordinate systems.

In step S7, the rendering means 200 stores an initial value "1" into an index register j used to retrieve vertexes, thereby initializing the index register J. In step S8, the first projected position calculating means 212 determines the position (coordinates) of a jth vertex as projected onto the uz plane.

In step S9, the angle calculating means 214 determines an angle (incident angle) $\theta1$ between a line segment interconnecting the viewpoint and the jth vertex and the normal in the uz plane. In step S10, the angle calculating means 214 determines an angle (exit angle) $\theta2$ based on the refractive index of the incident medium, the refractive index of the exit medium, and the incident angle $\theta1$.

In step S11, the first coordinate calculating means 216 projects the jth vertex by way of perspective projection in the direction determined by the position (coordinates) of the jth vertex as projected onto the uz plane and the exit angle $\theta2$, and determines the position (u coordinates) of the jth vertex in the background image 100.

Figure 10:
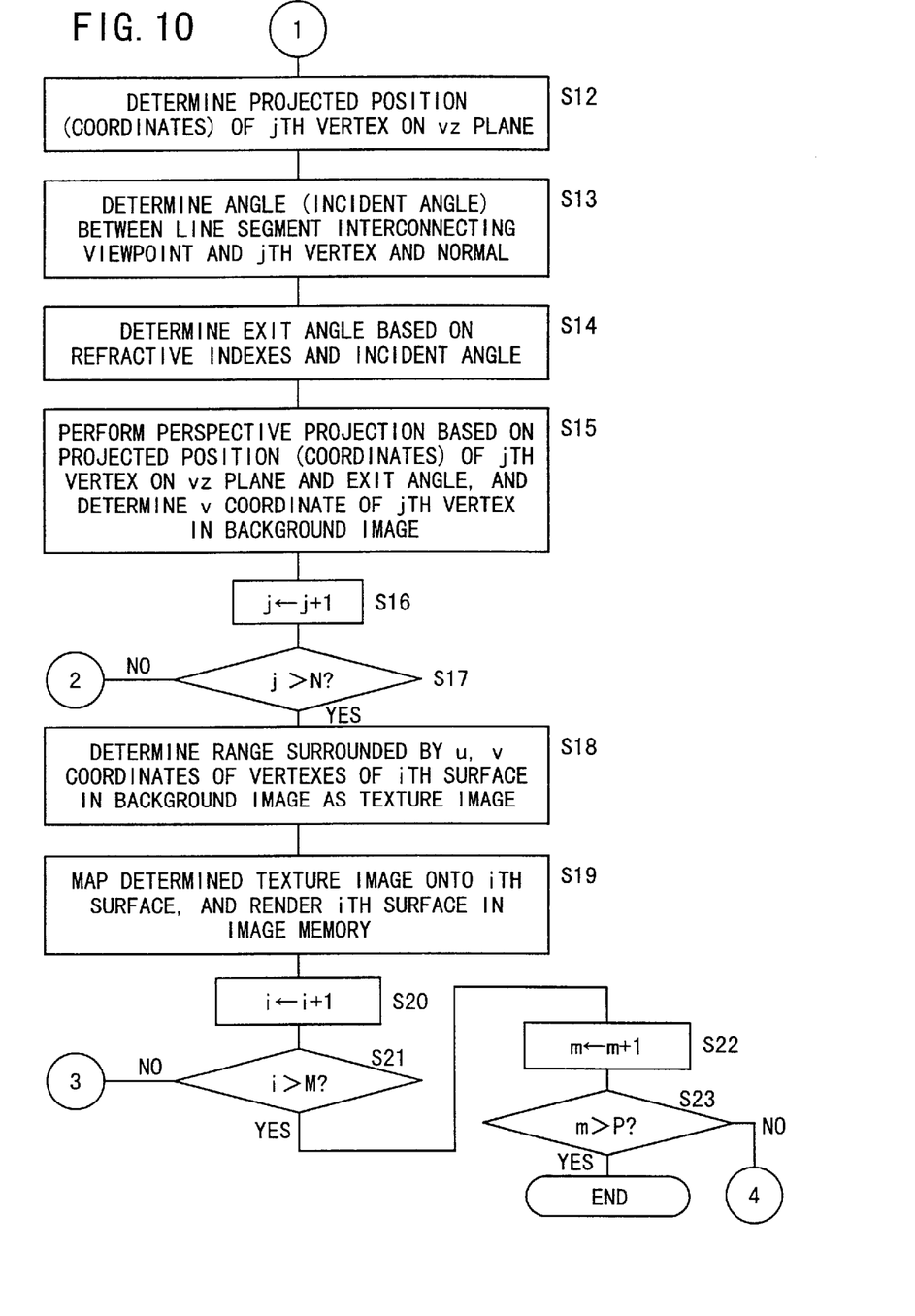

In step S12 shown in FIG. 10, the second projected position calculating means 218 determines the position (coordinates) of the jth vertex as projected onto the vz plane.

In step S13, the angle calculating means 214 determines an angle (incident angle) $\theta1$ between a line segment interconnecting the viewpoint and the jth vertex and the normal in the vz plane. In step S14, the angle calculating means 214 determines an angle (exit angle) $\theta2$ based on the refractive index of the incident medium, the refractive index of the exit medium, and the incident angle $\theta1$.

In step S14, the second coordinate calculating means 220 projects the jth vertex by way of perspective projection in the direction determined by the position (coordinates) of the jth vertex as projected onto the vz plane and the exit angle $\theta2$, and determines the position (v coordinates) of the jth vertex in the background image 100.

In step S16, the rendering means 200 increments the value of the index register j by "1". In step S17, the rendering means 200 decides whether uv coordinates of all the vertexes of the ith surface have been determined or not, based on whether the value of the index register j is greater than the number N of vertexes or not.

If uv coordinates of the vertexes of all the ith surface have not been determined, then control goes back to step S8 for determining uv coordinates of a next vertex. If uv coordinates of the vertexes of all the ith surface have been determined, then control proceeds to step S18. In step S18, the texture image determining means 222 determines a portion of the background image 100 in a range surrounded by the uv coordinates of the vertexes of the ith surface, as a texture image.

In step S19, the texture mapping means 224 maps the determined texture image onto the ith surface, and renders the ith surface with the mapped texture image in the image memory 74.

In step S20, the rendering means 200 increments the value of the index register i by "1". In step S21, the end determining means 226 decides whether the processings with respect to all the surfaces of the object have been completed or not, based on whether the value of the index register i is greater than the number M of surfaces of the object or not.

If the texture mapping has not been completed for all the surfaces, then control goes back to step S4 for processing a next surface. If the texture mapping has been completed for all the surfaces, then control proceeds to step S22 in which the rendering means 200 increments the value of the index register m by "1". In step S23, the end determining means 226 decides whether the processings with respect to all the objects have been completed or not, based on whether the value of the index register m is greater than the number P of objects or not.

If the processing with respect to all the objects have not been completed, then control goes back to step S4 for processing a next object. If the processing with respect to all the objects have been completed, then the processing sequence of the rendering means 200 is brought to an end.

As described above, when the rendering means according to the present embodiments 200 renders each surface of an object where light ray are refracted, the rendering means 200 uses only the background image 100 in each surface as a texture image, and hence can process images at a high speed. Consequently, light rays passing through an object and refracted thereby can be expressed at a high speed with a three-dimensional image, for thereby expressing a moving transparent object simply and at a high speed.

Although a certain preferred embodiment of the present invention has been shown and described in detail, it should be understood that various changes and modifications may be made therein without departing from the scope of the appended claims.

What is claimed is:

1. A method rendering an image, comprising:
   rendering at least a portion of said image behind an object with respect to a viewpoint of said image;
   selecting a surface of said object farthest from said viewpoint, said surface of said object having vertexes;
   projecting said vertexes of said surface of said object onto said portion or said image behind said object to a range of said portion; and
   employing said range of said portion as a texture to render said surface of said object;
   said employing step including employing, as the texture, a portion of a background image in a range projected by way of perspective projection with vectors which are directed from said viewpoint toward said background image and which take into account refractions at said vertexes of said surface when said surface is rendered, said vectors being determined based on at least directions of normals to said surface in a viewpoint coordinate system and directions of line segments directed from said viewpoint toward said vertexes of said surface, said vectors being determined by a process including:
      determining positions of said vertexes as projected onto a uz plane which is made up of a u-axis of said background image and a z-axis of said viewpoint coordinate system;
      determining coordinates of said vertexes on said u-axis of said background image based on at least directions of line segments directed from said viewpoint toward said projected positions and said directions of said normals to said surface in said uz plane;
      determining positions of said vertexes as projected onto a vz plane which is made up of a v-axis of said background image and said z-axis of said viewpoint coordinate system; and
      determining coordinates of said vertexes on said v-axis of said background image based on at least said directions of line segments directed from said viewpoint toward said projected positions and said directions of said normals to said surface in said vz plane, thereby to determine a position of said surface in said background image.

2. An apparatus for rendering an image, comprising:
   a rendering circuit operable to render at least a portion of said image behind an object with respect to a viewpoint of said image;
   a selecting circuit operable to select a surface of said object farthest from said viewpoint, said surface of said object having vertexes;
   a projecting circuit operable to project said vertexes of said surface onto said portion of said image behind said object to select a range of said portion;
   said rendering circuit being further operable to employ said range of said portion as a texture to render said surface of said object, said rendering circuit including:
      means for employing, as the texture, a portion of a background image in a range projected by way of perspective projection with vectors which are directed from said viewpoint toward said background image and which take into account refractions at said vertexes of said surface when said surface is rendered; and
      texture coordinate calculating means for determining said vectors based on at least directions of normals to said surface in a viewpoint coordinate system and directions of line segments directed from said viewpoint toward said vertexes of said surface;
   said texture coordinate calculating means including:
      first projected position calculating means for determining positions of said vertexes as projected onto a uz plane which is made up of a u-axis of said background image and a z-axis of said viewpoint coordinate system;
      first coordinate calculating means for determining coordinates of said vertexes on said u-axis of said background image based on at least directions of line segments directed from said viewpoint toward said projected positions and said directions of said normals to said surface in said uz plane;
      second projected position calculating means for determining positions of said vertexes as projected onto a vz plane which is made up of a v-axis of said background image and said z-axis of said viewpoint coordinate system; and
      second coordinate calculating means for determining coordinates of said vertexes on said v-axis of said background image based on at least said directions of line segments directed from said viewpoint toward said projected positions and said directions of said normals to said surface in said vz plane.

3. A recording medium storing a program and data for rendering an image, said program being operable to cause a processor to perform actions, said actions comprising:
   rendering at least a portion of said image behind an object with respect to a viewpoint of said image;
   selecting a surface of said object farthest from said viewpoint, said surface of said object having vertexes;

projecting said vertexes of said surface of said object onto said portion of said image behind said object to select a range of said portion; and employing said range of said portion as a texture to render said surface of said object;

said employing step including employing, as the texture, a portion of a background image in a range projected by way of perspective projection with vectors which are directed from said viewpoint toward said background image and which take into account refractions at said vertexes of said surface when said surface is rendered, said vectors being determined based on at least directions of normals to said surface in a viewpoint coordinate system and directions of line segments directed from said viewpoint toward said vertexes of said surface, said vectors being determined by a process including:

determining positions of said vertexes as projected onto a uz plane which is made up of a u-axis of said background image and a z-axis of said viewpoint coordinate system;

determining coordinates of said vertexes on said u-axis of said background image based on at least directions of line segments directed from said viewpoint toward said projected positions and said directions of said normals to said surface in said uz plane;

determining positions of said vertexes as projected onto a vz plane which is made up of a v-axis of said background image and said z-axis of said viewpoint coordinate system; and determining said coordinates of said vertexes on said v-axis of said background image based on at least said directions of line segments directed from said viewpoint toward said projected positions and said directions of said normals to said surface in said vz plane.

* * * * *

UNITED STATES PATENT AND TRADEMARK OFFICE
CERTIFICATE OF CORRECTION

PATENT NO. : 6,784,882 B1
DATED : August 31, 2004
INVENTOR(S) : Hajime Sugiyama

It is certified that error appears in the above-identified patent and that said Letters Patent is hereby corrected as shown below:

Column 5,
Lines 14 and 19, "lay" should read -- ray --.

Column 6,
Line 36, after "A2" insert -- → --.
Line 36, after "A4" insert -- → --.
Line 56, "The" should read -- the --.
Line 64, "AS" should read -- A5 --.

Column 7,
Lines 1, 4 and 5, "AS" should read -- A5 --.

Column 9,
Line 37, after "method" insert -- of --.
Line 43, "or" should read -- of --.
Line 43, after "to" insert -- select --.

Signed and Sealed this

Eighth Day of February, 2005

JON W. DUDAS
*Director of the United States Patent and Trademark Office*